Sept. 12, 1967 G. G. BERGH ETAL 3,340,638
DISPLAY FRAME
Filed Dec. 14, 1965 2 Sheets-Sheet 1

INVENTOR.
GEORGE G. BERGH
ROBERT G. BERGH
*Russell, Chittick & Pfund*

United States Patent Office 3,340,638
Patented Sept. 12, 1967

3,340,638
DISPLAY FRAME
George G. Bergh and Robert G. Bergh, North Attleboro, Mass., assignors to Bergh Bros., Co., Inc., Attleboro Falls, Mass., a corporation of Massachusetts
Filed Dec. 14, 1965, Ser. No. 513,763
9 Claims. (Cl. 40—152)

This invention relates to an improved construction for display frames of the type used in displaying sheet material such as paintings, photographs, maps and the like.

Conventional display frames normally include the combination of a protective front panel made of glass, plastic or some other transparent material, a back member of approximately the same dimensions as the protective panel, and a wall member surrounding both the protective panel and back member. The sheet material to be displayed, which for descriptive purposes will hereinafter be referred to as a "picture," is held within the frame assembly in a protected position between the transparent panel and back member.

When initially mounting a picture or other type of sheet material in conventional display frames of the above-described type, experience has indicated that difficulty is frequently encountered in maintaining all of the frame components in proper alignment and order until the assembly is finally locked together. This is due primarily to the fact that a secure interlocked relationship cannot be achieved until the back member is finally positioned. Prior to this time, when the picture is being inserted and properly aligned, there exists the danger of the transparent protective panel becoming disengaged from the wall member. This of course lends a measure of uncertainty to the task of mounting the picture. Moreover, where the transparent protective panel is made of glass as is often the case, breakage is likely to occur if the protective panel becomes accidentally disengaged from the wall member.

This disadvantage has now been overcome in a novel manner by the present invention, an object of which is to provide a display frame embodying means for permanently fixing the transparent protective panel relative to the surrounding wall member. This is accomplished by utilizing a wall member specially adapted to be assembled around the transparent protective panel. The wall member is provided with spaced parallel flanges which extend inwardly on either side of the panel. Filler members cooperate with the wall flanges in frictionally securing the panel within the wall member, thus completely avoiding any possibility of subsequent accidental dislocation.

Another object of the present invention includes the provision of additional filler members which may be utilized in connection with the aforementioned wall flanges to recess the protective panel into the wall member, thus enhancing the overall appearance of the frame assembly.

A further object of the present invention is to provide a frame assembly wherein access may be gained to the displayed sheet material by removal of a single component. This is in contrast to conventional frame assemblies which must usually be entirely disassembled when initially inserting or subsequently changing the sheet material being displayed.

These and other objects of the present invention will become more apparent as the description proceeds with the aid of the accompanying drawings in which.

Figure 1:
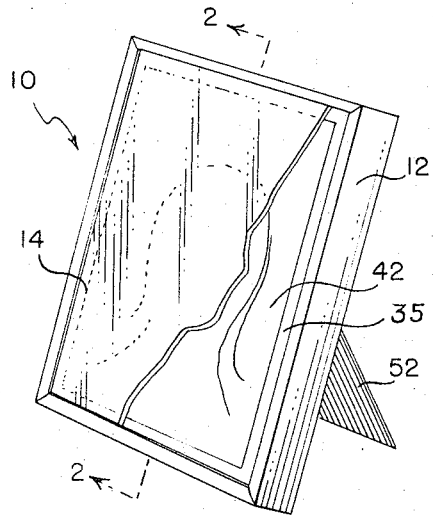
FIG. 1 is a perspective view of a display frame embodying the concepts of the present invention.
Figure 2:
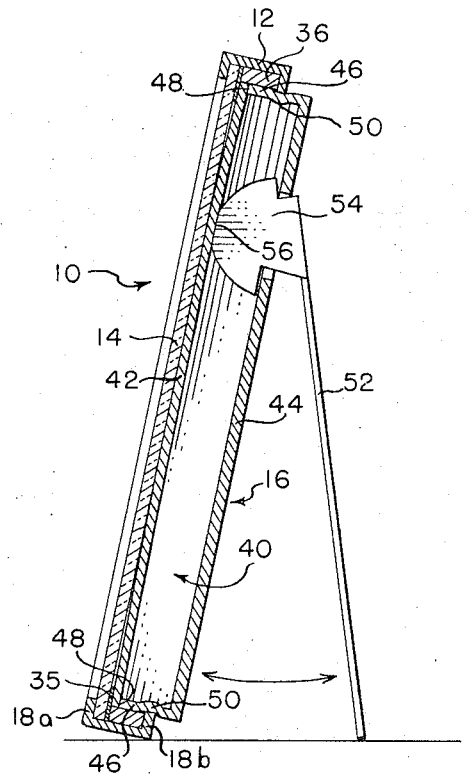
FIG. 2 is a sectional view on a substantially enlarged scale taken along line 2—2 of FIG. 1.
Figure 5:
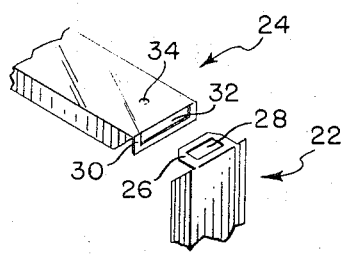
FIG. 5 is an enlarged perspective view showing the male and female ends of the wall members immediately prior to their being interlocked.
Figure 3:
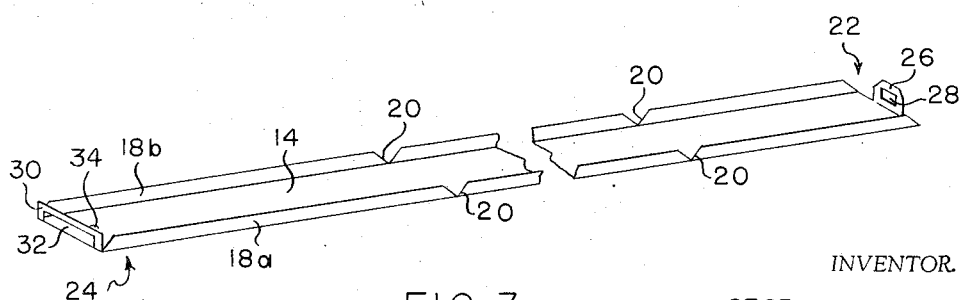
FIG. 3 is a perspective view of the unitized wall member prior to its being bent to conform to the shape of the transparent protective panel.
Figure 4:
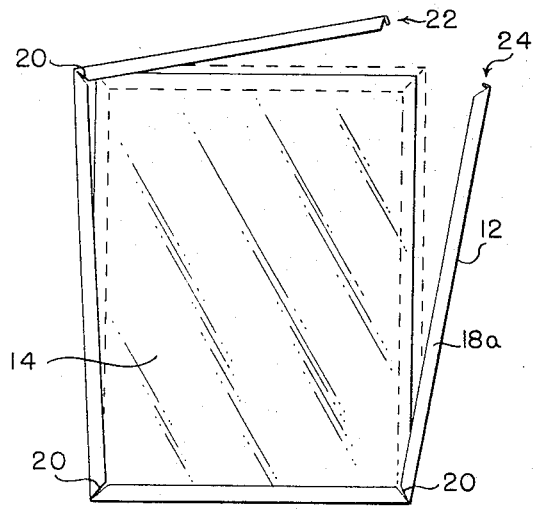
FIG. 4 is a schematic illustration of the transparent protective panel with the wall member partially extending around the peripheral edge thereof.

Referring initially to FIGS. 1 and 2 wherein are best shown general features of one embodiment of the present invention, a display frame 10 is shown comprised basically of a wall member 12, a transparent protective front panel 14 and a back member 16. As herein shown the wall member is comprised of a single length of strip material (see FIG. 3) stamped to provide two spaced parallel flanges 18a and 18b notched at selected transversely aligned points as at 20. By bending the strip material as shown in FIG. 4 at the notched points 20, a unitized wall construction is obtained. As shown in FIGS. 3 and 5, the opposite ends of wall member 12 are suitably fabricated to provide male and female ends generally indicated by the reference numerals 22 and 24. Male end 22 is comprised of an inwardly turned locking lip 26 provided with an appropriately positioned aperture 28. Female end 24 is in turn comprised of a transversely extending flange 30 provided with a suitably dimensioned lip receiving slot 32. When the male and female ends are brought together, lip 26 is simply inserted into the slot 32 in flange 30. A detent 34 on female end 24 will thus snap into aperture 28 on lip 26, placing the male and female ends in interlocked engagement.

Figure 6:
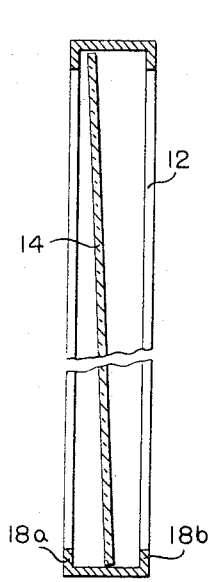
FIG. 6 is a sectional view on a reduced scale showing the wall member assembled around the transparent protective panel.

The first step in assembling the illustrated frame assembly is shown in FIG. 4 wherein it can be seen that wall member 12 has been bent at the transversely aligned notches 20 to form an integral four-sided enclosure. By bringing the male and female ends 22 and 24 into locked engagement, the transparent panel 14 is enclosed within wall member 12, thus locating the parallel flanges 18a and 18b on either side of the panel as shown in FIG. 6. At this point, the transparent panel is free to move relative to the wall member as illustrated to some extent by its inclined position in FIG. 6.

It should be understood that a unitized wall member is not a requisite in the present frame assembly. As an alternative, the wall member can be made up of a number of separable sides, each side having at its ends suitable interlocking means. Moreover, the wall member when assembled can be round, curved or multisided with all sides arranged in a non-parallel fashion. However, the important concept to be kept in mind is that with any wall construction, inwardly disposed wall flanges such as those indicated in the drawings by the reference numerals 18a and 18b must be provided on either side of the transparent protective panel. The flanges need not be continuous, nor must they be coextensive with the longitudinal edges of the wall member or members. The flanges must however, provide opposed faces between which transparent panel 14 will ultimately be located when the wall member is assembled.

Figure 7:
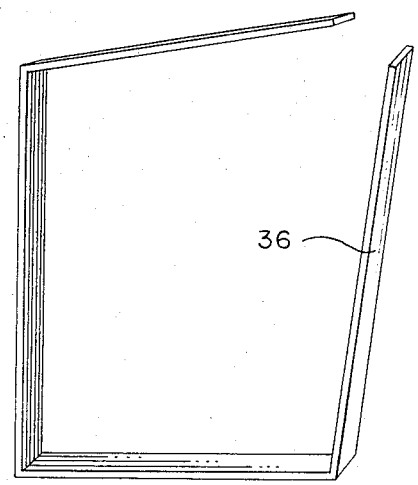
FIG. 7 is a perspective view of a unitized filler piece.

The next step in the assembly of the frame is to fix the position of transparent panel 14 relative to the surrounding wall member 12, which has now had its male and female ends 22 and 24 locked together. To this end, filler pieces hereinafter generally referred to by the reference numeral 36 are utilized. As shown in FIG. 7, the filler pieces may be made up of a single strip of bendable material such as for example heavy paper, leather, etc. Here again, however, a unitized construction is not required for the filler piece. As an alternative, separable filler pieces corresponding in number and length to the interior sides of the wall member 12 may be utilized.

Figure 8A:
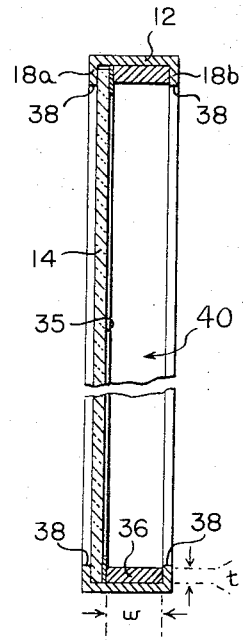
FIG. 8a is a sectional view taken through the frame assembly showing a filler piece wedged between the transparent protective panel and one of the wall flanges, thus forcing the panel against the other wall flange.

The filler piece (or pieces as the case may be) are adapted to cooperate with wall flanges 18a and 18b in wedgingly securing the transparent protective panel 14 relative to the surrounding wall member 12. Where the transparent protective panel 14 is to be held against the interior surface of one of the wall flanges 18a in approximate alignment with one edge of the wall member 12, as is the case with the embodiment shown in FIGS. 1, 2 and 8a, then the filler piece 36 should be of sufficient width when combined with an intermediate thin border 35, to wedge the panel tightly in place against flange 18a. The border 35 is an optional feature designed to hide the edges of the sheet material 42 after it has been positioned in the frame assembly. As shown in FIG. 8a which is an illustration of the wall and panel combination incorporated into the frame assembly shown in FIGS. 1 and 2, the width "w" of the filler piece 36 is such that when the filler piece is wedged between wall flange 18b and border 35, the border in turn being in face-to-face contact with the panel 14, the panel will be held tightly against the inside surface of wall flange 18a. The thickness "t" of the filler pieces is approximately equal to the lateral width of each of the wall flanges 18a and 18b, thus cooperating with the inwardly disposed edges 38 of the wall flanges and the inside surface of panel 14 to define a recess 40 suitably dimensioned to receive the sheet material to be displayed. Of course, if the border 35 were to be omitted, then the width "w" of the filler piece 36 would be increased slightly.

Figure 8B:
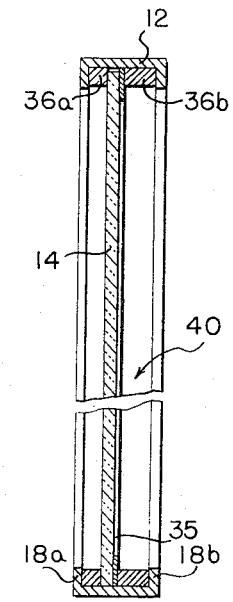
FIG. 8b is a sectional view similar to FIG. 8a showing filler pieces inserted on both sides of the transparent protective panel, thus placing the panel in a recessed position within the wall member.

An alternate embodiment of the invention is shown in FIG. 8b wherein it can be seen that the transparent panel 14 is fixed in a recessed position relative to the surrounding wall member 12 by means of two filler pieces 36a and 36b. Filler piece 36a is wedged between the inside surface of wall flange 18a and one side of panel 14, and filler piece 36 is wedged between wall flange 18b and border member 35, the latter being in face-to-face contact with the rear surface of the panel. By recessing the transparent protective panel 14, a different style and appearance is achieved without material alteration to the main frame components i.e., the wall member 12, transparent panel 14 and back member 16.

In any event, whether the transparent panel 14 be positioned against one of the wall flanges as shown in FIGS. 1, 2 and 8a or in a recessed position as shown in FIG. 8b, it is important to note that after the filler pieces 38 have been wedged in place, there is no longer any possibility of the panel 14 becoming accidentally disengaged. This is true even though the frame assembly has not yet been fully assembled. Stated in another way, in spite of the fact that the back member 16 remains to be installed, thus exposing the interior of recess 40, the transparent protective panel 14 is properly positioned and fixed relative to wall member 12. This is to be contrasted to conventional display frames where until the back member is installed, the transparent panel is free to move relative to the wall member.

With the filler pieces installed, either as shown in FIG. 8a or 8b, the frame assembly is ready to receive the sheet material to be displayed, which material as indicated in FIG. 2 by the reference numeral 42 will be placed in recess 40 in face-to-face contact with the inner surface of transparent panel 14. Once this has been accomplished, the back member 16, herein shown as a pan-shaped member having a rear surface 44 and sides 46, is pushed into recess 40 until the edges of sides 46 come into contact with the rear surface of sheet material 42 as at 48. If desired, the outside dimension of back member 16 can be made slightly larger than the area circumscribed by the inner edge of wall flange 18b, thus resulting in a slight deformation and a combination of frictional and mechanical engagement of sides 46 as at 50.

With the back member 16 in place, as is best shown in FIG. 2, the frame assembly is complete. The sheet material 42 is securely held between transparent protective panel 14, the inner surfaces of filler piece 48 (in turn supported by wall member 12) and the back member 16.

Where the frame 10 is to be supported on an easel on a flat surface such as a table or desk, the back member 16 may further be provided with a support leg 52 pivotally mounted for movement from an inoperative position flush against the back surface 44 to an operative position angularly disposed therefrom as shown in FIGS. 1 and 2. Support leg 52 may additionally be provided with a cam 54 which includes a flat surface or edge 56 designed to seat against the rear surface of sheet material 42 (in turn supported by panel 14) when the leg is operatively positioned.

In view of the foregoing, it should now be apparent that the present display frame assembly contains a number of advantageous features. For example, means are provided for fixing the transparent protective panel 14 relative to the surrounding wall member 12 without relying on the final positioning of back member 16. Thus, the sheet material to be displayed may be positioned and aligned in the frame assembly without fear of the transparent panel accidentally becoming dislocated during the mounting process. Moreover, access is provided to recess 40 by simply removing back member 16, with all of the other frame components remaining securely interlocked. This feature adds significantly to the attractiveness of the unit by simplifying considerably the task of mounting and interchanging the sheet material to be displayed.

It is our intention to cover all changes and modifications of the embodiments herein chosen for purposes of disclosure which do not depart from the spirit and scope of the invention as defined by the claims appended hereto.

We claim:

1. A display frame for sheet material comprising in combination: a transparent protective panel; a wall member extending around the periphery of said panel, said wall member having integral spaced parallel flanges extending inwardly therefrom on either side of said panel, wedge means cooperating with said flanges to fix said panel relative to said wall member, the wall member and panel when thus fixed defining a recess suitably dimensioned to receive the said sheet material therein in face-to-face contact with the inner surface of said panel; and, a back member adapted for insertion into said recess to an operative position abutting said sheet material, whereby said sheet material will be held securely within said frame assembly against said panel.

2. The combination as set forth in claim 1 wherein said flanges extend coextensively with the longitudinal edges of said wall member.

3. The combination as set forth in claim 2 wherein said wedge means is comprised of at least one filler member between said panel and one of said flanges, said filler member being operative to force said panel against the other of said flanges in approximate alignment with one edge of said wall member.

4. The combination as set forth in claim 3 further characterized by at least one additional filler member positioned between the other of said flanges and said panel, the said panel thus being fixed in a plane intermediate the longitudinal edges of said wall member.

5. The combination as set forth in claim 4 wherein the thickness of said filler members is approximately equal to the lateral dimension of said flanges.

6. The combination as set forth in claim 5 further characterized by said back member being frictionally secured in said operative position by one of said flanges.

7. The combination as set forth in claim 6 further characterized by said wall member having a plurality of non-parallel sides.

8. The combination as set forth in claim 7 further characterized by said back member being provided with a support leg pivotally mounted for movement from an inoperative position flush against said back member to an operative position angularly disposed therefrom, and cam means on said support leg for holding said leg in said operative position.

9. A display frame comprising in combination: a transparent protective panel; a wall member extending around the periphery of said panel, said wall member having spaced parallel flanges extending inwardly therefrom on either side of said panel; means wedged between said panel and at least one of said flanges for fixing said panel relative to said wall member, the panel when thus fixed cooperating with said wall member to define a recess suitably dimensioned to receive the item to be displayed; and, a back member adapted for insertion into said recess in an operative position frictionally engaged by one of said flanges.

References Cited
UNITED STATES PATENTS

| | | | |
|---|---|---|---|
| 2,521,603 | 9/1950 | Prew | 40—152 |
| 2,663,105 | 12/1953 | Woodbury | 40—152 |
| 2,970,397 | 2/1961 | Roseman | 40—156 |

EUGENE R. CAPOZIO, *Primary Examiner.*

W. J. CONTRERAS, *Assistant Examiner.*